(12) United States Patent
Nomura

(10) Patent No.: US 9,280,900 B2
(45) Date of Patent: Mar. 8, 2016

(54) VEHICLE EXTERNAL ENVIRONMENT RECOGNITION DEVICE

(71) Applicant: FUJI JUKOGYO KABUSHIKI KAISHA, Tokyo (JP)

(72) Inventor: Naoki Nomura, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/478,928

(22) Filed: Sep. 5, 2014

(65) Prior Publication Data

US 2015/0091715 A1 Apr. 2, 2015

(30) Foreign Application Priority Data

Sep. 27, 2013 (JP) ................. 2013-202627

(51) Int. Cl.

| | | |
|---|---|---|
| *B60Q 1/00* | (2006.01) | |
| *G08G 1/16* | (2006.01) | |
| *H04N 13/02* | (2006.01) | |
| *G06K 9/00* | (2006.01) | |
| *G06T 7/00* | (2006.01) | |
| *H04N 13/00* | (2006.01) | |

(52) U.S. Cl.
CPC ............ *G08G 1/166* (2013.01); *G06K 9/00362* (2013.01); *G06T 7/0046* (2013.01); *H04N 13/02* (2013.01); *H04N 13/0257* (2013.01); G06T 2207/10012 (2013.01); G06T 2207/10021 (2013.01); G06T 2207/30196 (2013.01); G06T 2207/30252 (2013.01); H04N 13/0239 (2013.01); H04N 2013/0081 (2013.01)

(58) Field of Classification Search
CPC .............. G08G 1/166; G06K 9/00805; G06K 9/00369; G06K 9/00362; G06T 2207/10012

USPC .......... 340/435; 348/116, 118, 148; 382/103; 701/301

See application file for complete search history.

(56) References Cited

U.S. PATENT DOCUMENTS

| | | | | |
|---|---|---|---|---|
| 5,410,346 A | * | 4/1995 | Saneyoshi | B60R 1/00 348/116 |
| 6,961,466 B2 | * | 11/2005 | Imagawa | G06K 9/00362 382/190 |
| 7,684,590 B2 | * | 3/2010 | Kampchen | G06K 9/00805 382/103 |
| 8,599,252 B2 | * | 12/2013 | Komoto | G06T 7/2006 382/103 |
| 8,861,842 B2 | * | 10/2014 | Jung | G06K 9/00369 382/155 |
| 9,070,023 B2 | * | 6/2015 | Du | G06K 9/00369 |

FOREIGN PATENT DOCUMENTS

| | | |
|---|---|---|
| JP | 2008-045974 A | 2/2008 |
| JP | 2012-194864 A | 10/2012 |

* cited by examiner

*Primary Examiner* — John A Tweel, Jr.
(74) *Attorney, Agent, or Firm* — McDermott Will & Emery LLP

(57) ABSTRACT

A vehicle exterior environment recognition device includes a three-dimensional position deriving module that derives three-dimensional positions of subject parts in a real space based on an image obtained by imaging a detection area, an object identifying module that groups the subject parts of which differences in the three-dimensional positions are within a predetermined range to identify an object, a positional point deriving module that derives a positional point based on positional information of the object, an appearance point deriving module that derives an appearance point based on appearance information of the object, and a pedestrian identifying module that identifies the object to be a pedestrian when a pedestrian point that is obtained by at least adding the positional point to the appearance point equals to or greater than a predetermined threshold.

17 Claims, 9 Drawing Sheets

| TRAVELING PATH LATERAL POSITION | < 1 M | ≥ 1 M < 3 M | ≥ 3 M < 5 M | ≥ 5 M |
|---|---|---|---|---|
| POINT | 3 | 2 | 1 | 0 |

FIG. 4A

| TRAVELING SPEED | < 1 MPS | ≥ 1 MPS < 3 MPS | ≥ 3 MPS < 5 MPS | ≥ 5 MPS |
|---|---|---|---|---|
| POINT | 0 | 1 | 2 | 3 |

FIG. 4B

| ACCUMULATED MOVING AMOUNT | < 0.5 M | ≥ 0.5 M < 1.0 M | ≥ 1.0 M < 1.5 M | ≥ 1.5 M |
|---|---|---|---|---|
| POINT | 0 | 1 | 2 | 3 |

FIG. 4C

| INTEGRATED TOTAL POINT | < 6 POINTS | ≥ 6 POINTS < 8 POINTS | ≥ 8 POINTS |
|---|---|---|---|
| POSITIONAL POINT | - 1 | + 0 | + 1 |

FIG. 4D

| HEIGHT | < 0.8 M | ≥ 0.8 M < 1.2 M | ≥ 1.2 M < 2.0 M | ≥ 2.0 M < 2.2 M | ≥ 2.2 M |
|---|---|---|---|---|---|
| POINT | 0 | 8 | 10 | 5 | 0 |

FIG. 5A

| ASPECT RATIO | < 100% | ≥ 100% < 150% | ≥ 150% < 300% | ≥ 300% < 400% | ≥ 400% |
|---|---|---|---|---|---|
| POINT | 0 | 5 | 10 | 8 | 0 |

FIG. 5B

| SPATIAL RELATIONSHIP | COMPLETELY OUTSIDE | POSSIBLY OUTSIDE | INSIDE DETECTION AREA |
|---|---|---|---|
| POINT | 0 | 5 | 10 |

FIG. 5C

| PARTIALITY | CERTAINLY PART OF LARGE OBJECT | POSSIBLY PART OF LARGE OBJECT | NOT PART OF LARGE OBJECT |
|---|---|---|---|
| POINT | 0 | 5 | 10 |

FIG. 5D

| ARTIFICIALITY | ARTIFICIAL OBJECT | POSSIBLY ARTIFICIAL OBJECT | NOT ARTIFICIAL OBJECT |
|---|---|---|---|
| POINT | 0 | 5 | 10 |

FIG. 5E

| CAUTION LEVEL | 5 POINTS | 2 POINTS TO 4 POINTS | 0 POINT TO 1 POINT |
|---|---|---|---|
| FRAME APPEARANCE POINT | SUM OF APPEARANCE INFORMATION X 1.0 | SUM OF APPEARANCE INFORMATION X 0.9 | SUM OF APPEARANCE INFORMATION X 0.8 |

FIG. 5F

| INTEGRATED TOTAL POINT | < 60 POINTS | ≥ 60 POINTS < 70 POINTS | ≥ 70 POINTS < 80 POINTS | ≥ 80 POINTS < 90 POINTS | ≥ 90 POINTS |
|---|---|---|---|---|---|
| APPEARANCE POINT | - 4 | + 0 | + 2 | + 6 | + 8 |

FIG. 5G

VEHICLE EXTERNAL ENVIRONMENT RECOGNITION DEVICE

CROSS-REFERENCE TO RELATED APPLICATION

The present application claims priority from Japanese Patent Application No. 2013-202627 filed on Sep. 27, 2013, the entire contents of which are hereby incorporated by reference.

BACKGROUND

1. Technical Field

The present invention relates to a vehicle external environment recognition device that identifies a specific object to which an object within a detection area corresponds.

2. Related Art

There are conventionally known a technique, such as collision avoidance control, which detects specific objects including another vehicle located ahead of a vehicle and avoid a collision with a leading vehicle (e.g.,), and a technique, such as a cruise control, which controls so as to maintain a distance between a vehicle and a leading vehicle at a safe distance (for instance, see Japanese Unexamined Patent Application Publication (JP-A) No. 2012-194864).

Such front monitoring techniques for a vehicle may be useful for avoiding and alleviating a minor collision not only with a leading vehicle but with a rushing-out pedestrian. Since the rushing-out pedestrian may suddenly appear into a detection area from various directions unlike the leading vehicle, time after the pedestrian appeared ahead of the vehicle until the vehicle approaches the pedestrian is short in many cases. Thus, an operator's momentary looking-aside, a slight delay of operation, etc. may greatly influence the occurrence of the minor collision. Therefore, expectations for the collision avoidance control described above have been increasing.

Meanwhile, if a malfunction event of the collision avoidance control, for instance, an event where the control erroneously recognizes an object to be a pedestrian and applies a brake to the vehicle occurs, the vehicle operator may distrust the collision avoidance control. Therefore, it is desired to achieve collision avoidance control which can avoid a minor collision accurately and quickly but without malfunctions.

For instance, JP-A No. 2008-45974 discloses a technique that uses as a feature vector the contour of an object contained in images acquired by imaging devices and to perform pattern matching with contour geometric models prepared in advance, thereby improving the accuracy of identifying the pedestrian.

However, as described above, the malfunction must be avoided in the collision avoidance control. Accordingly, when an object (pedestrian) enters into the detection area of the imaging device(s), a long period of time is required to identify the object to be a pedestrian as a result of determining that the appearance of the object matches with a contour geometric model of the pedestrian.

SUMMARY OF THE INVENTION

The present disclosure has been designed in consideration of the circumstances described above, and an object thereof is to provide a vehicle external environment recognition device that detects a pedestrian accurately and quickly.

One aspect of the present disclosure provides a vehicle external environment recognition device including: a three-dimensional position deriving module that derives three-dimensional positions of subject parts in a real space based on an image obtained by imaging a detection area; an object identifying module that groups the subject parts of which differences in the three-dimensional positions are within a predetermined range to identify an object; a positional point deriving module that derives a positional point based on positional information related to the position of the object; an appearance point deriving module that derives an appearance point based on appearance information related to the appearance of the object; and a pedestrian identifying module that identities the object to be a pedestrian when a pedestrian point that is obtained by at least adding the positional point to the appearance point equals to or greater than a predetermined threshold.

The pedestrian identifying module may identify the object to be a pedestrian when the appearance point is a predetermined value or greater and the pedestrian point equals to or greater than the threshold.

The positional point may be derived based on one or more parameters selected from the group consisting of a traveling path lateral position, a traveling speed, and an accumulated moving amount of the object.

The appearance point may be derived based on one or more parameters selected from the group consisting of a height, an aspect ratio, a spatial relationship, a partiality, an artificiality, a contour agreement, and a caution level of the object.

The vehicle external environment recognition device may further include a contour identifying module that identifies a contour of the object from an edge based on luminance of the image, and a color tone determining module that compares color tones of pixels inside and outside the contour of the object to identify the object to be a pedestrian based on a result of the comparison.

Another aspect of the present disclosure provides a vehicle external environment recognition device including: a three-dimensional position deriving module that derives three-dimensional positions of subject parts in a real space based on an image obtained by imaging a detection area; an object identifying module that groups the subject parts of which differences in the three-dimensional positions are within a predetermined range to identify an object; a contour identifying module that identifies a contour of the object from an edge based on luminance of the image; and a color tone determining module that compares color tones of pixels inside and outside the contour of the object to identify the object to be a pedestrian based on a result of the comparison.

BRIEF DESCRIPTION OF THE DRAWINGS

The present disclosure is illustrated by way of example and not by way of limitation in the figures of the accompanying drawings, in which the like reference numerals indicate like elements and in which:

FIGS. 4A to 4D are tables illustrating relations between positional information and frame positional points;

FIGS. 5A to 5G are tables illustrating relations between appearance information and the frame appearance points;

DETAILED DESCRIPTION

Hereinafter, suitable examples of the present disclosure will be described in detail with reference to the accompanying drawings. Note that dimensions, materials, and others such as specific numerical values illustrated in the examples are merely instances for easier understanding of the present disclosure, and these instances are not intended to limit the present disclosure unless otherwise particularly described. Note that, in this description and the accompanying drawings, elements having substantially the same function and the configuration are denoted with the same numerals to omit redundant explanation, and illustration of elements which are not directly related to the present disclosure is omitted herein.

In recent years, vehicles having so-called a collision avoidance function (adaptive cruise control: ACC) have been widely spreading. This function images the road environment ahead of the vehicle by on-board cameras mounted to the vehicles, identifies objects such as leading vehicles based on color information and/or positional information within the image to avoid a collision with the identified object, and/or maintains an inter-vehicle distance with the leading vehicle at a safe distance. In this collision avoidance function, various obstacles ahead of the vehicles are identified, and the avoidance control is suitably performed according to whether the obstacles are stationary objects or moving objects. The moving objects may mainly be other vehicles and pedestrians. In the case of the pedestrian, the identification is difficult and takes a long time because the pedestrian may suddenly appear into the detection area from various directions, and the size of the pedestrian is absolutely smaller than the vehicles.

For instance, even if the technique that identifies the object to be a pedestrian by performing the pattern matching with the appearance of the object is used, the object must be identified to be a pedestrian after the appearance is matched over a plurality of frames in order to avoid the malfunction of the vehicle due to the erroneous recognition of the object to be a pedestrian. Therefore, a long time will be required for identifying the pedestrian. Thus, one purpose of this example is to detect a pedestrian quickly and accurately by determining a pedestrian-likeness earlier, using not only the appearance information related to the appearance of the object but also positional information related to the position of the object. Below, an environment recognition system for achieving such a purpose will be described, and a vehicle external environment recognition device which is a particular component of the system will be described in detail.

(Environment Recognition System 100)

Figure 1:
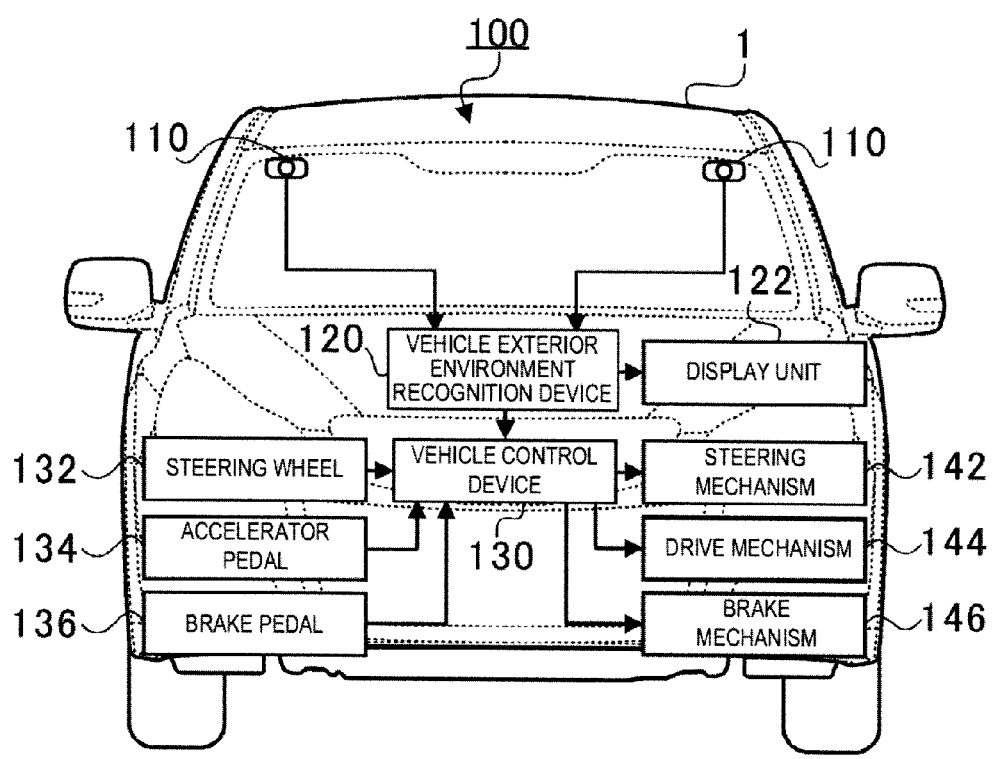
FIG. 1 is a block diagram illustrating a connecting relation of an environment recognition system device according to an example of the present disclosure.

FIG. 1 is a block diagram illustrating a connecting relation of an environment recognition system 100. The environment recognition system 100 includes a pair of imaging devices 110, a vehicle exterior environment recognition device 120, and a vehicle control device 130 (which is typically comprised of an electronic control unit (ECU)), which are all provided inside a vehicle 1 (hereinafter, simply referred to as "the vehicle").

Each imaging device 110 is comprised of image sensor elements, such as charge-coupled devices (CCDs) or complementary metal-oxide semiconductors (CMOSs). The imaging device 110 can image the environment ahead of the vehicle 1 to generate a color image or a monochrome image consisting of three hues (R (red), G (green), and B (blue)). Here, the color image imaged by the imaging device 110 is referred to as luminance image and distinguished from a distance image described later.

The two imaging devices 110 are laterally disposed so as to be separated from each other so that optical axes of the imaging devices 110 are oriented substantially parallel to each other toward the traveling direction of the vehicle 1. Each imaging device 110 sequentially generates image data (i.e., a frame) which is obtained by imaging object(s) existing in a detection area ahead of the vehicle 1 per frame at every 1/60 seconds (i.e., 60 fps). Note that the objects to be recognized include a solid object that exists independently, such as another vehicle, a pedestrian, a traffic light, a road (course), a guardrail and a building, as well as an object which can be identified as part of the solid object, such as a taillight, a blinker, each light emitting parts of each traffic light. Each functional module described below carries out each processing for every frame, triggered at refreshing of such image data.

The vehicle exterior environment recognition device 120 acquires the image data from each of the two imaging devices 110, derives a parallax using so-called pattern matching, associates the derived parallax information (corresponding to a depth distance described later) with the image data to generate the distance image. The luminance image and the distance image will be described later in detail. The vehicle exterior environment recognition device 120 identifies a specific object to which an object within the detection area ahead of the vehicle 1 corresponds, by using the luminance of the object based on the luminance image and the depth distance of the object from the vehicle 1 based on the distance image.

When the vehicle exterior environment recognition device 120 identifies the specific object, it derives a relative speed or the like of the specific object (e.g., a leading vehicle) while tracking the specific object, and then determines whether the possibility of the specific object colliding with the vehicle 1 is high. Here when the vehicle external environment recognition device 120 determines that the possibility of a collision is high, the vehicle exterior environment recognition device 120 then gives (informs) a vehicle operator a warning indication of possibility through a display unit 122 installed in front of the operator, and outputs information indicative of the possibility to the vehicle control device 130.

The vehicle control device 130 receives operational inputs by the vehicle operator through a steering wheel 132, an accelerator (or a gas pedal) 134 and a brake pedal 136, and then controls the vehicle 1 by transmitting the received inputs to a steering mechanism 142, a drive mechanism 144, and a brake mechanism 146, respectively. The vehicle control device 130 controls the drive mechanism 144 and the brake mechanism 146 according to instructions from the vehicle exterior environment recognition device 120.

Below, the configuration of the vehicle exterior environment recognition device 120 is described in detail. Here, the procedure of identifying an object to be a pedestrian, which is a feature of this example, will be described in detail, and configurations unrelated to the feature of this example will be omitted.

(Vehicle Exterior Environment Recognition Device 120)

Figure 2:
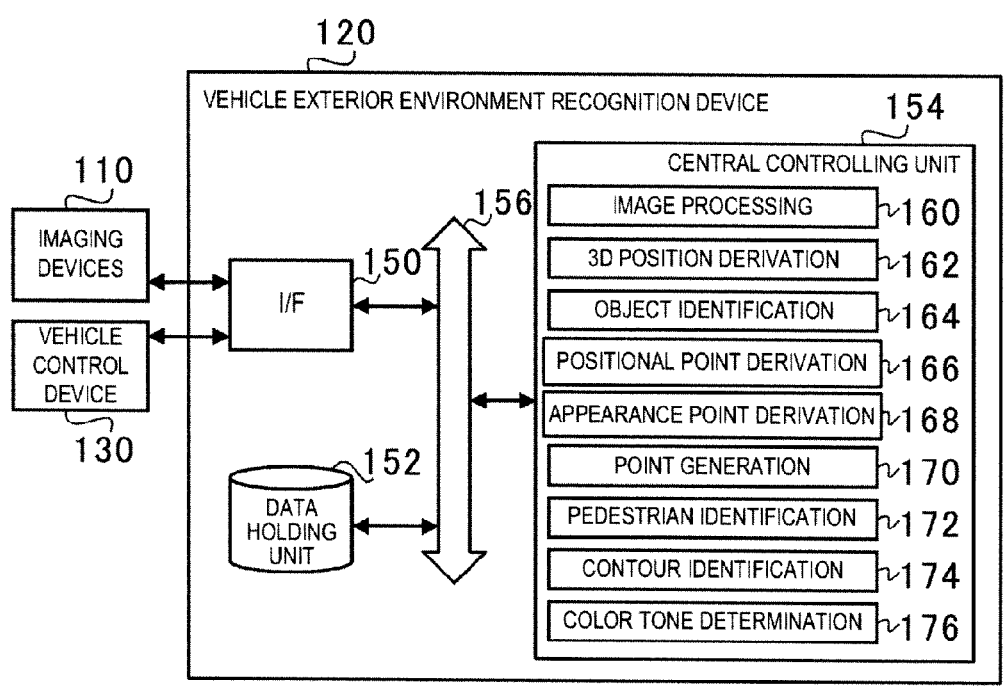
FIG. 2 is a functional block diagram schematically illustrating functions of a vehicle exterior environment recognition.

FIG. 2 is a functional block diagram schematically illustrating functions of the vehicle exterior environment recognition device 120. As illustrated in FIG. 2, the vehicle exterior environment recognition device 120 is comprised of an interface (I/F) unit 150, a data holding unit 152, and a central controlling unit 154.

The I/F unit 150 is an interface that performs bidirectional information exchanges with the imaging devices 110 and/or the vehicle control device 130. The data holding unit 152 is comprised of one or more RAMs, one or more flash memories, one or more HDDs, etc. The data holding unit 152 holds various information required for processing of each functional module described below. In addition, the data holding unit 152 temporarily holds the image data received from the imaging devices 110.

The central controlling unit 154 is comprised of one or more integrated circuit, including one ore more central processing units (CPUs), one or more ROMs where one or more programs or the like are stored, and one or more RAMs or the like as work areas. The central controlling unit 154 controls, for instance, the I/F unit 150, the data holding unit 152, etc. through a system bus 156. In this example, the central controlling unit 154 also functions as an image processing module 160, a three-dimensional (3D) position deriving module 162, an object identifying module 164, a positional point deriving module 166, an appearance point deriving module 168, a point generating module 170, a pedestrian identifying module 172, a contour identifying module 174, and a color tone determining module 176. Hereinafter, detailed operations will be described in order of image processing, object identification processing, and pedestrian identification processing, based on general purposes of such functional modules.

(Image Processing)

The image processing module 160 acquires the image data from each of the two imaging devices 110 and extracts any one of blocks (for example, each block has a matrix of 4 pixels in horizontal directions×4 pixels in vertical directions) from the image data generated by one of the imaging devices 110 and then searches a block in the image data generated by the other imaging device 110, which corresponds to the extracted block. By using so-called pattern matching, the image processing module 160 derives the parallax. Note that the term "horizontal" as used herein may refer to lateral directions of a screen surface, and the term "vertical" as used herein may refer to vertical directions of the screen surface, perpendicular to the horizontal directions.

The pattern matching may include comparisons between the two pieces of image data in luminance (Y color-difference signal) for every block which represents any one of image locations. Specifically, the pattern matching may be techniques, such as SAD (Sum of Absolute Difference) in which differences in luminance are calculated, SSD (Sum of Squared intensity Difference) in which the differences are squared before being used, and NCC (Normalized Cross Correlation) in which similarities of variances which are obtained by subtracting an average value of the luminance of the pixels from the luminance of each pixel. The image processing module 160 performs such block-by-block parallax derivation processing for all the blocks which correspond to the detection area (for example, 600 pixels in the horizontal directions×180 pixels in the vertical directions). Note that the block has a matrix of 4 pixels in the horizontal directions×4 pixels in the vertical directions in this example, however each block may contain any number of pixels.

Note that, the image processing module 160 can derive the parallax for every block which corresponds to the smallest unit of detection resolution; however, it cannot recognize what part of what the block corresponds to. For this reason, the parallax information is independently derived not per object but per detection resolution (e.g., per block) in the detection area. Note that the term "distance image" as used herein refers to the image that is obtained by associating the image data with the parallax information (corresponding to the depth distance described later) derived by the above-described way.

Figure 3A:
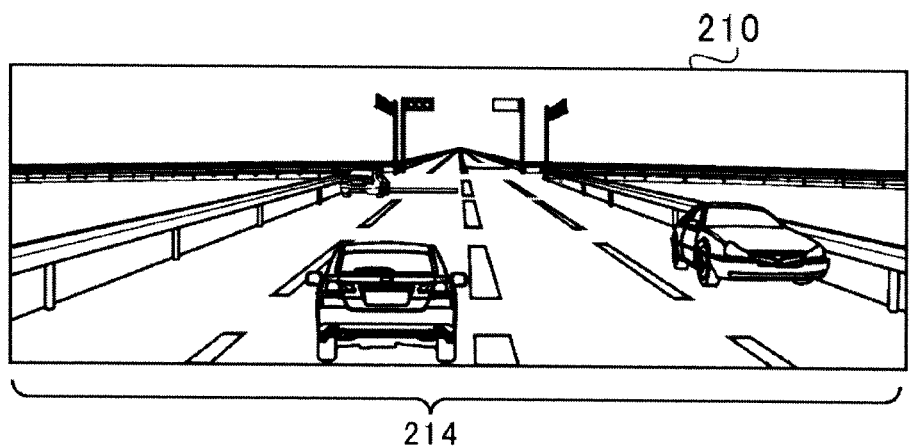
FIGS. 3A and 3B are views illustrating a luminance image and a distance image, respectively.
Figure 3B:
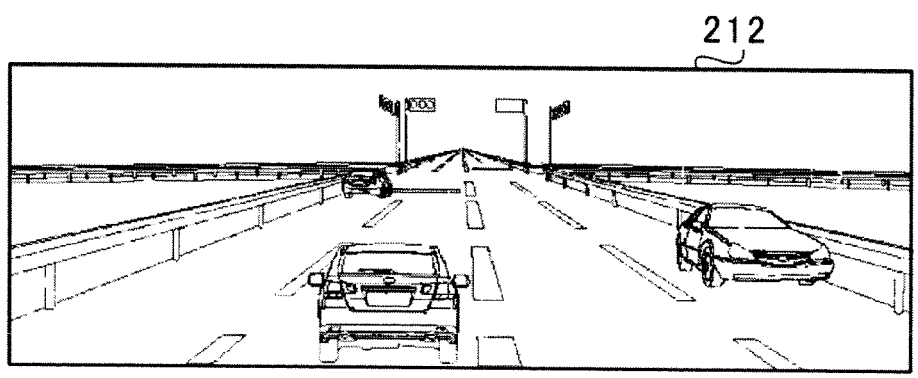

FIGS. 3A and 3B are diagrams illustrating a luminance image 210 and a distance image 212, respectively. For example, suppose that the luminance image 210 (image data) corresponding to a detection area 214 are generated through the two imaging devices 110. For easier understanding, as illustrated in FIG. 3A, only one of the two luminance images 210 generated by the imaging devices 110 is schematically illustrated. In this example, the image processing module 160 calculates the parallax for every block from such a luminance image 210, and forms the distance image 212 as illustrated in FIG. 3B. The parallax is associated with each corresponding block in the distance image 212. For convenience of explanation, the blocks for which the parallaxes are derived are represented by black dots.

Returning to FIG. 2, the 3D position deriving module 162 converts the parallax information for every block in the detection area 214 into three-dimensional (3D) positional information in real space including a horizontal (lateral) distance, a height, and a depth distance, by using so-called a stereo method based on the distance image 212 generated by the image processing module 160. Note that the stereo method is to derive the depth distance of a subject part with respect to the imaging devices 110 based on the parallax of the subject part in the distance image 212 by using a triangulation method. At this time, the 3D position deriving module 162 derives a height of the subject part from a road surface based on the depth distance of the subject part, and a detected distance on the distance image 212 between the subject part and a point location on the road surface at the same depth distance as the depth distance of the subject part. Then, the derived 3D positional information is again associated with the distance image 212. Since various known techniques can be applied to the derivation processing of this depth distance and/or the identification processing of the 3D position and, thus, description thereof is omitted herein.

(Object Identification Processing)

The object identifying module 164 groups the subject parts (pixels and blocks) within the detection area 214 by using the 3D positional information based on the distance image 212 to identify an object Specifically, the object identifying module 164 selects any one of subject parts as a reference point and groups the selected subject part with other subject parts of which differences in the horizontal distance, differences in the height, and differences in the depth distance are within a predetermined range to make these subject parts to be one unitary object. Note that the predetermined range can be expressed by distances in real space, and can be set to any value (for instance, 1.0 m). Further, the object identifying module 164 similarly groups the newly-added subject part by the previous grouping with other subject parts of which differences in the horizontal distance, differences in the height, and differences in the depth distance are within the predetermined range, using the newly-added subject part as a reference point. As a result, all the subject parts will be grouped as one unitary object if the distances are within the predetermined range.

(Pedestrian Identification Processing)

Next, the object is determined to be a pedestrian or not based on the position and the appearance of the object.

The positional point deriving module 166 derives a positional point based on the positional information related to the position of the object. The positional information includes, for instance, a traveling path lateral position that is a relative position of the object from an end of the vehicle 1 in a direction perpendicular to the course of the vehicle 1, a traveling speed of the vehicle 1, and an accumulated moving amount indicative of an accumulated amount of the movement after the object enters into the detection area 214. The traveling speed and the moving amount may be scalar quantities without considering a moving direction of the object, or only a component in a specific direction, such as a horizontal direction, of each of the traveling speed and the moving amount may be used in consideration of the moving direction. The positional point deriving module 166 integrates points according to the positional information to derive a frame positional point for every frame.

FIGS. 4A to 4D are tables illustrating relations between the positional information and the frame positional points. Referring to FIG. 4A, if the traveling path lateral position is less than 1 m, 3 points are given; if 1 m or greater and less than 3 m, 2 points; if 3 m or greater and less than 5 m, 1 point; and if 5 m or greater, 0 point. Referring to FIG. 4B, if the traveling speed is less than 1 m/s, 0 point is given; if 1 m/s or greater and less than 3 m/s, 1 point; if 3 m/s or greater and less than 5 m/s, 2 points; and if 5 m/s or greater, 3 points. Referring to FIG. 4C, if the accumulated moving amount is less than 0.5 m, 0 point is given; if 0.5 m or greater and less than 1.0 m, 1 point; if 1.0 m or greater and less than 1.5 m, 2 points; and if 1.5 m or greater, 3 points.

The points given to the traveling path lateral position, the traveling speed, and the accumulated moving amount are added together to obtain an integrated frame positional point (0 to 9 points). Then, as illustrated in FIG. 4D, the positional point deriving module 166 obtains a point corresponding to the integrated frame positional point, and adds it to a positional point derived for a previous frame to derive a new positional point. Therefore, the positional point varies by ±1 point for every frame.

Further, the positional point has an upper limit and a lower limit, and in this example, the lower limit is set to 0 point and the upper limit is set to 5 points. Since the upper and lower limits are thus provided, even if a period during which no pedestrian is detected or a period during which one or more pedestrians have been detected becomes a long period of time, the absolute value of the point will not be large. Therefore, it is possible to promptly and exactly determine the existence of pedestrian(s) when the detected state and the non-detected state of the pedestrian(s) switch therebetween. Further, if the upper limit is set to 5 points, it is avoidable that the point reaches a threshold for determining to be a pedestrian (in this example, 20 points) only based on the positional point, and it is possible to identify the pedestrian only when an appearance point (described later) is a significant value (a predetermined value or greater). Note that the limits can be set to any values.

The appearance point deriving module 168 derives the appearance point based on the appearance information related to the appearance of the object. The appearance information includes, for instance, a height of the object from the ground surface; an aspect ratio of a vertical length with respect to a lateral length of the object; a spatial relationship of the object with respect to the detection area 214; a partiality indicative of whether the object constitutes part of a large object; an artificiality indicative of similarity of the object to an artificial object; a contour agreement indicative of similarity of the contour of the object to a pedestrian; and a caution level indicative of the possibility of the object being an object for which automatic braking is needed (thus, the caution level is higher as the object is located close to a front area of the vehicle 1, as the object travels faster, and as the accumulated moving amount of the object is larger). Then, the appearance point deriving module 168 integrates points according to the appearance information to derive the frame appearance point for every frame, similar to the positional point.

FIGS. 5A to 5G are tables illustrating relations between the appearance information and the frame appearance points. Referring to FIG. 5A, if the height of the object is less than 0.8 m, 0 point is given; if 0.8 m or greater and less than 1.2 m, 8 points; if 1.2 m or greater and less than 2.0 m, 10 points; if 2.0 m or greater and less than 2.2 m, 5 points; and if 2.2 m or greater, 0 point. Referring to FIG. 5B, if the aspect ratio is less than 100%, 0 point is given; if 100% or greater and less than 150%, 5 points; if 150% or greater and less than 300%, 10 points; if 300% or greater and less than 400%, 8 points; and if 400% or greater, 0 point. Referring to FIG. 5C, if the spatial relationship indicates a location completely outside the detection area 214, 0 points are given; if there is a possibility of the spatial relationship located outside the detection area 214, 5 points; and if located inside the detection area 214, 10 point.

Further, referring to FIG. 5D, if the object is certainly determined to be part of the large object, 0 point is given; if there is a possibility to be part of the large object, 5 points; and if the object can be determined not to be part of the large object, 10 points. Referring to FIG. 5E, the artificiality can be determined to be an artificial object, 0 point is given; if there is a possibility to be an artificial object, 5 points; and if the artificiality can be determined not to be an artificial object, 10 points. Further, although illustration is omitted, the contour agreement is determined to be from 0 to 50 points based on the correlation derived by matching with a model pattern.

Next, the appearance point deriving module 168 integrates the points given to the height, the aspect ratio, the spatial relationship, the partiality, the artificiality, and the contour agreement to obtain a frame appearance point (0 to 100 points). The appearance point deriving module 168 then multiplies the frame appearance point by a coefficient according to the caution level as illustrated in FIG. 5F. Then, as illustrated in FIG. 5G, the appearance point deriving module 168 obtains a point associated with the frame appearance point, and adds it to an appearance point derived for a previous frame to derive a new appearance point. Therefore, the appearance point varies by a width of −4 to +8 for every frame. The numerical values according to the determination of the frame appearance point and the appearance point, and the frame positional point and the positional point described above can be set optionally.

The point generating module 170 adds the positional point derived by the positional point deriving module 166 to the appearance point derived by the appearance point deriving module 168 to generate a pedestrian point.

The pedestrian identifying module 172 compares the pedestrian point generated by the point generating module 170 with a predetermined threshold (here, 20 points). If the pedestrian point equals to or greater than the threshold, the pedestrian identifying module 172 identifies the object to be a pedestrian. Thus, since the positional point generated based on the positional information is derived and the derived positional point is then added to the pedestrian point in addition to the appearance point, the pedestrian-likeness of the object can be determined based on the position of the object before the object is determined to be a pedestrian based on the appearance. Therefore, if a pedestrian exists ahead of the vehicle 1, the pedestrian point can reach the threshold relatively earlier and, thus, it is possible to detect the pedestrian accurately and quickly.

Note that, if the appearance point is not a significant value (here, >1), the pedestrian identifying module 172 will not identify the object to be a pedestrian even if the pedestrian point only based on the positional point equals to or greater than the threshold. The positional point simply plays an auxiliary role for the appearance point, and refers to the positional point as well only when the appearance point is the significant value. Therefore, a situation of erroneously recognizing the object to be a pedestrian unintentionally only based on the positional point although the object cannot be determined to be a pedestrian based on the appearance, is avoidable. In this example, the pedestrian point reaching the threshold only based on the positional point is avoided regardless of the length of time during which the point indicative of the positional information being determined to be a pedestrian continues, by providing the upper limit less than the threshold to the positional point.

Figure 6A:
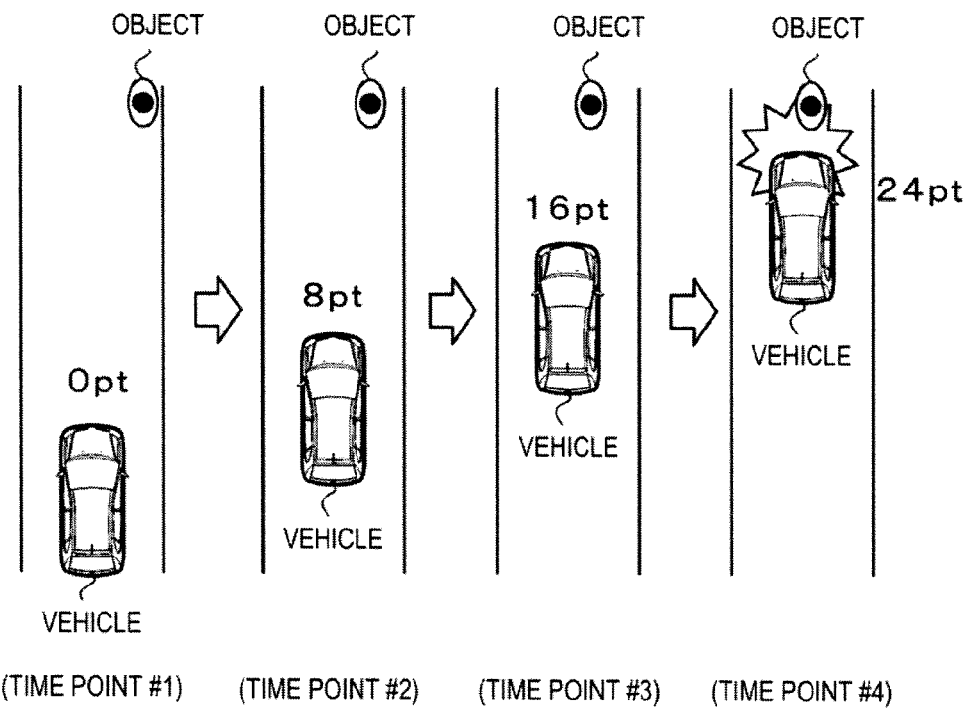
FIGS. 6A and 6B are diagrams illustrating generated examples of a pedestrian point.
Figure 6B:
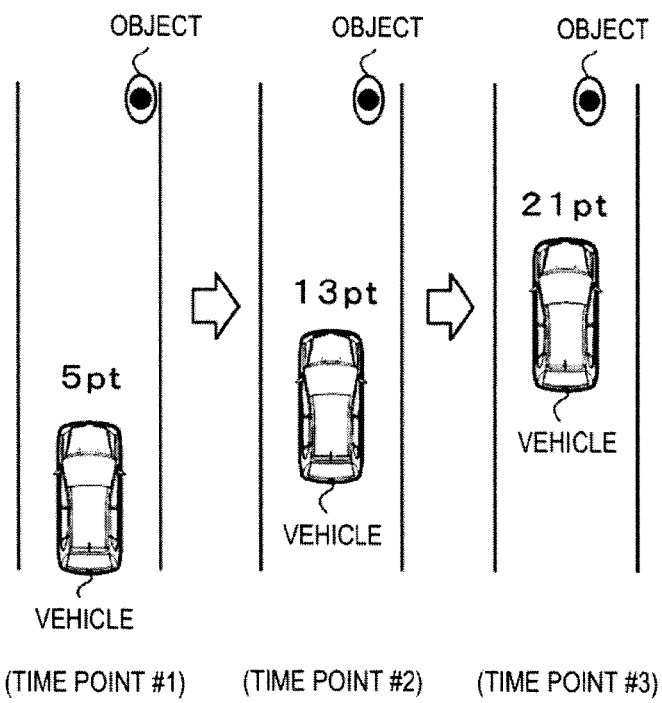

FIGS. 6A and 6B are diagrams illustrating generated examples of the pedestrian point, where FIG. 6A illustrates conventional processing and FIG. 6B illustrates processing of this example. At a time point #1 in FIGS. 6A and 6B, although the object can be determined to be a pedestrian based on the positional information on the object, the object cannot yet be determined to be a pedestrian based on the appearance information. Therefore, in the conventional processing of determining whether the object is a pedestrian only based on the appearance of the object, the pedestrian point of the time point #1 in FIG. 6A is 0 point. On the other hand, in this example, if the object can be determined to be a pedestrian based on the positional information, the positional points are integrated. Therefore, the pedestrian point may have already reached 5 points, which is the upper limit, also at the time point #1 in FIG. 6B.

Further, as illustrated in FIG. 6A, in a case where the appearance point becomes 8 points at a time point #2 and the appearance point becomes 16 points at a time point #3 in the conventional processing, the pedestrian point is still 16 points and has not yet reached the threshold (here, 20 points) at the time point #3. Therefore, a particular action of the vehicle 1 (e.g., stopping the vehicle) is eventually performed at a time point #4 at which the appearance point solely reaches the threshold. On the other hand, in the example illustrated in FIG. 6B, since the object is determined based on the pedestrian point which is obtained by adding the positional point to the appearance point, the pedestrian point becomes 13 points at the time point #2, and the pedestrian point becomes 21 points at the time point #3. Therefore, at the time point #3 at which the threshold is reached, the vehicle 1 can be stopped and, thus, it can be understood that the vehicle 1 can act against the environment outside the vehicle 1 earlier than the conventional case of FIG. 6A.

Figure 7:
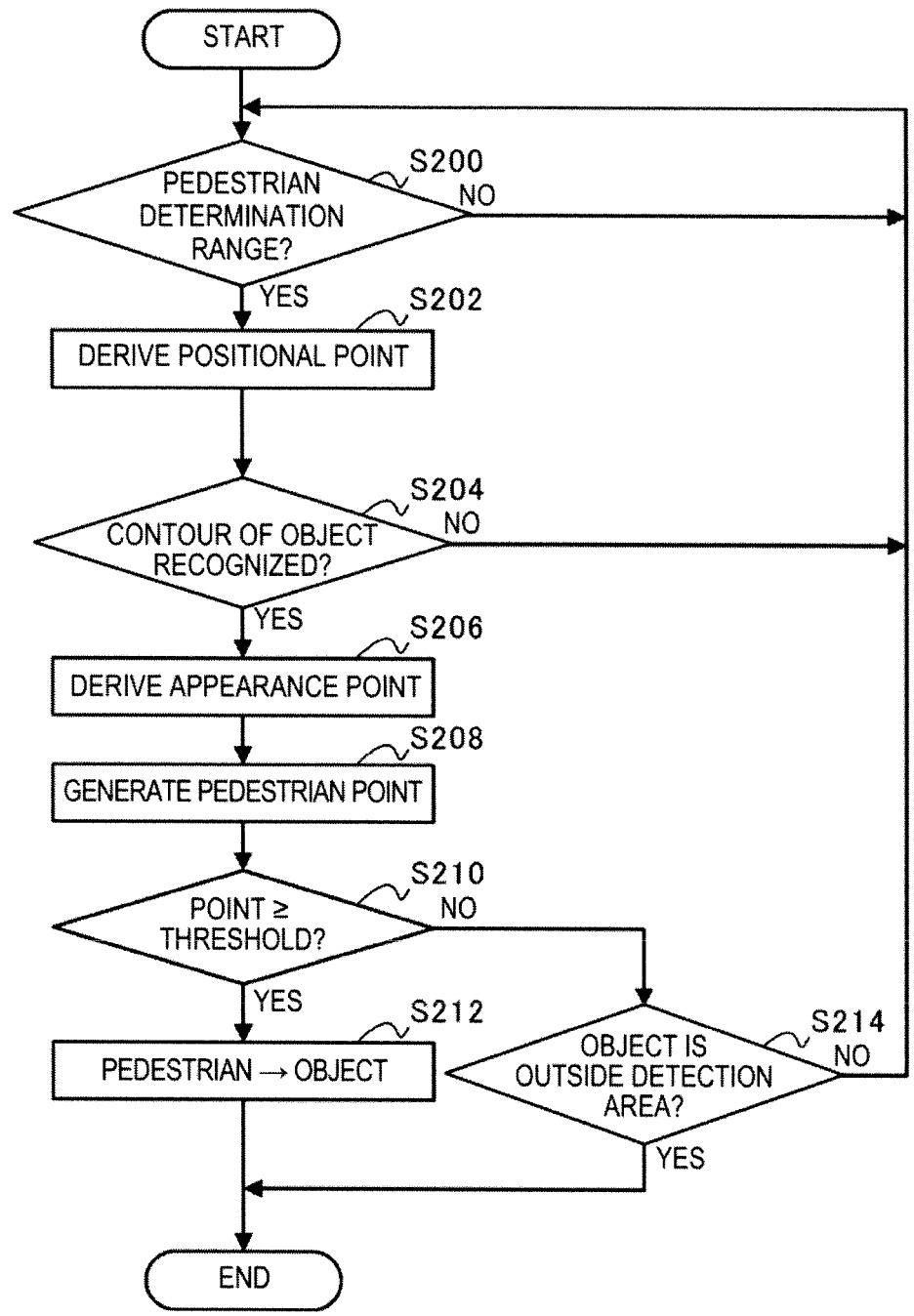
FIG. 7 is a flowchart illustrating a flow of the entire processing of a pedestrian determination.

FIG. 7 is a flowchart illustrating a flow of the entire processing of the pedestrian determination. This pedestrian determination processing is performed frame by frame for every object which is contained in the detection area 214.

As illustrated in FIG. 7, the positional point deriving module 166 first determines whether the height and the width of the object fall within the range for determining to be a pedestrian (S200). If they fall within the determination range (YES at S200), the positional point is then derived (S202). In the positional point derivation processing, as illustrated in FIGS. 4A to 4D, the positional point deriving module 166 integrates the points respectively corresponding to the traveling path lateral position, the traveling speed, and the accumulated moving amount, and derives the frame positional point. The positional point deriving module 166 further obtains the point associated with the derived frame positional point, and adds it to the positional point derived for the previous frame to derive the new positional point.

Then, the appearance point deriving module 168 determines whether the contour of the object can be recognized (S204). If the contour can be recognized (YES at S204), the appearance point deriving module 168 then derives the appearance point (S206). In the appearance point derivation processing, as illustrated in FIGS. 5A to 5G, the appearance point deriving module 168 integrates the points respectively corresponding to the height, the aspect ratio, the spatial relationship, the partiality, the artificiality, the contour agreement, and the caution level to derive the frame appearance point. The appearance point deriving module 168 further obtains the point associated with the derived frame appearance point, and adds it to the appearance point derived for the previous frame to derive the new appearance point.

Next, the point generating module 170 adds the positional point derived by the positional point deriving module 166 to the appearance point derived by the appearance point deriving module 168 to generate the pedestrian point (S208). The pedestrian identifying module 172 then determines whether the pedestrian point equals to or greater than the threshold (S210). If the pedestrian point equals to or greater than the threshold (YES at S210), the pedestrian identifying module 172 determines the object to be a pedestrian (S212), and ends the pedestrian determination processing. On the other hand, if the pedestrian point is less than the threshold (NO at S210), the pedestrian identifying module 172 then determines whether the object is outside the detection area 214 (S214). If the object is outside the detection area 214 (YES at S214), the pedestrian identifying module 172 ends the pedestrian determination processing.

On the other hand, if the height and the width of the object does not fall within the range where the object can be determined to be a pedestrian (NO at S200), if the contour of the object cannot be recognized (NO at S204), or if the object is not outside the detection area 214 (NO at S214), the pedestrian identifying module 172 then determines that the object may still be determinable to be a pedestrian, and repeats the processing from Step S200.

Other Examples

Alternatively or additionally to the example described above, the pedestrian can also be determined as described in other examples below.

Figure 8A:
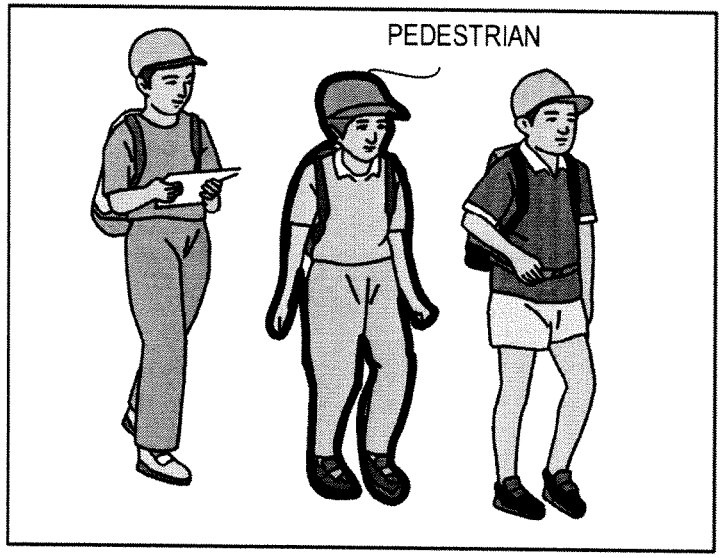
FIGS. 8A and 8B are diagrams illustrating another example.
Figure 8B:
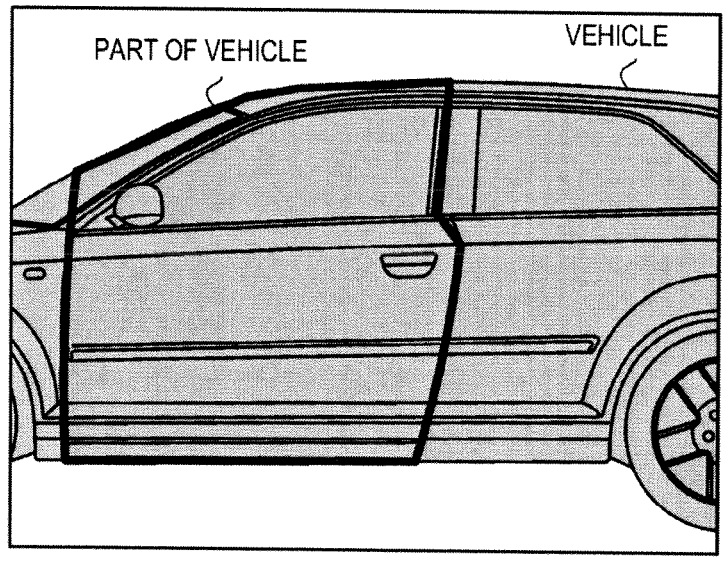

FIGS. 8A and 8B are diagrams illustrating other examples. Pedestrians may wear various cloths of various colors and patterns, and have different colors of skin and hair, for instance. Therefore, as illustrated in FIG. 8A, the color tone often differs between the pedestrians and other areas (e.g., background) bordering on the pedestrian's contour. Meanwhile, as a thick line illustrated in FIG. 8B, part of a vehicle or the like may be erroneously recognized to be a pedestrian. However, vehicles often appear to have comparatively fewer color tones and other parts of the same vehicle exist next to the erroneously-recognized part as illustrated in FIG. 8B. Thus, the color tones are often equal to each other bordering on the contour of the subject part, between the subject part and other areas (especially, area laterally next to the subject part). Here, focusing on such characteristics of the color tones which tend to be different between the pedestrian and the other areas, the determination accuracy of pedestrians can be improved.

The contour identifying module 174 identifies the contour of the object from an edge extracted from the luminance image 210 based on the luminance. The color tone determining module 176 compares color tones (R, G, and B) inside and outside the contour of the object to identify the object to be a pedestrian as a result. Here, the luminance information is not used, and, for instance, only the color tones are compared so that a difference between bright blue and dark blue is difficult to be generated.

Figure 9A:
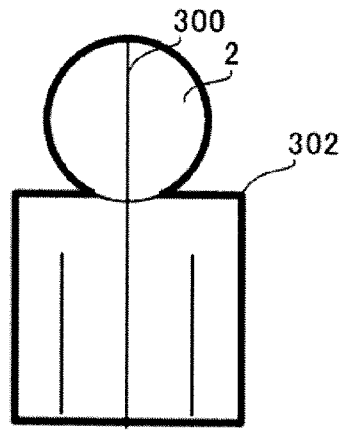
FIGS. 9A to 9C are diagrams illustrating operation of a color tone determining module.
Figure 9B:
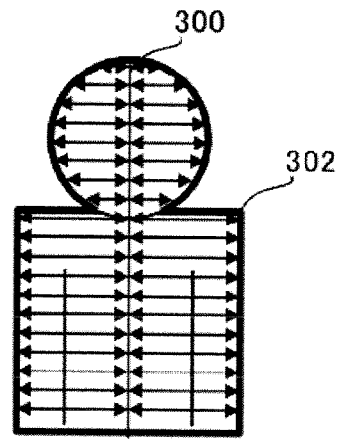
Figure 9C:
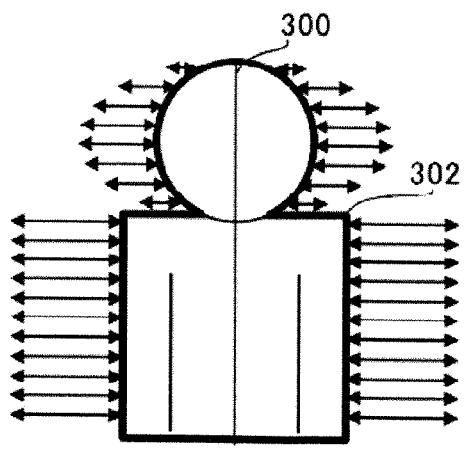

FIGS. 9A to 9C are diagram illustrating operation of the color tone determining module 176. Specifically, as illustrated in FIG. 9A, the color tone determining module 176 first derives a vertically-extending center line 300 indicative of a horizontal center (a line passing through the center of gravity) of an object 2. The color tone determining module 176 then identifies a pair of left and right representative contour pixels on a contour 302 (illustrated by a thick line) of the object 2 so that one pair of representative contour pixels are selected at the same height of the object 2. Thus, the two representative contour pixels of the same pair are located at the same distance but different direction from the center line 300. Similarly, the color tone determining module 176 sequentially identifies another pair at a different height and repeats this procedure for the entire height of the object 2. Therefore, same number of the representative contour pixels exist at left and right of the center line 300, and the number of the representative contour pixels are the same as the number of pixels of the center line 300.

Then, as illustrated in FIG. 9B by bidirectional arrows, the color tone determining module 176 integrates the color tones of the pixels in the horizontal direction from the representative contour pixel on each side to the center line 300 and divides the integrated value by the number of integrated pixels to calculate an average value of the color tones. The average value is associated with the corresponding representative contour pixel, and this procedure is repeated for all the representative contour pixels (i.e., all the height positions and both left and right). Next, as illustrated in FIG. 9C, the color tone determining module 176 similarly derives an average value of color tones of pixels in the horizontal direction, outwardly from each representative contour pixel on the contour, respectively. The number of pixels from which the average values of the color tones are derived is identical to the number of pixels from each representative contour pixel to the center line 300, as illustrated in FIG. 9C. In this way, the average values of the color tones inside and outside the contour can be derived on equal conditions (e.g., based on the number of pixels).

Next, the color tone determining module 176 compares the average value of the color tones inside and outside the contour for each representative contour pixel to calculate a difference therebetween, and then integrates the numbers of the representative contour pixels of which the differences become greater than a predetermined threshold. The color tones may be compared by total values of each of the differences of R, G and B values. Then, the color tone determining module 176 compares the integrated value with the total number of the representative contour pixels. If the integrated value is greater than a predetermined ratio (here, 50%) of the total number, the color tone determining module 176 identifies the object to be a pedestrian. The predetermined ratio suitable for determining to be a pedestrian is set to 50% in this example as a result of experiments, but the ratio may be any other values according to the environment outside the vehicle and the appearances of the pedestrians.

Note that the pedestrian determination by other examples described above simply plays an auxiliary role of the pedestrian determination based on the pedestrian point, and is effective to be used when more certainly and more promptly determining the pedestrian based on the pedestrian point.

As described above, the pedestrians are detectable accurately and quickly in this example by carrying out the pedestrian determination of the object based on the positional information in advance, even when the objects cannot be determined to be pedestrians based on the appearances of the objects. Moreover, the accuracy of the pedestrian determination can further be improved by determining the pedestrian-likeness based on the color tones inside and outside the contour of each object.

Further, programs that cause one or more computers to function as the vehicle exterior environment recognition device 120, and storage media where the programs are recorded, such as flexible discs, magneto-optic discs, ROMs, CDs, DVDs, BDs, which can be read by the computers may also be provided. Note that the term "program" as used herein refers to data set described in any of languages and/or describing methods.

As described above, although suitable examples of the present disclosure are described referring to the accompanying drawings, it is needless to say that the present disclosure is not limited to those examples. It is apparent that those skilled in the art can comprehend various kinds of changes or modifications within the scope described in the appended claims, and it should be understood that the technical scope of the present disclosure also encompasses those derivatives.

Note that it is not necessary to perform the processes or steps of the method of identifying the pedestrian in this description in a time series in accordance with the order described in the flowchart, and the processes may also include one or more parallel processing or subroutine(s).

The present disclosure can be applied to the vehicle external environment recognition device which identifies the specific object to which the object existing within the detection area corresponds.

The invention claimed is:

1. A vehicle external environment recognition device, comprising:
   a three-dimensional position deriving module that derives three-dimensional positions of subject parts in a real space based on an image obtained by imaging a detection area;
   an object identifying module that groups the subject parts of which differences in the three-dimensional positions are within a predetermined range to identify an object;
   a positional point deriving module that derives a positional point based on positional information related to the position of the object;
   an appearance point deriving module that derives an appearance point based on appearance information related to the appearance of the object; and
   a pedestrian identifying module that identifies the object to be a pedestrian when a pedestrian point that is obtained by at least adding the positional point to the appearance point equals to or greater than a predetermined threshold.

2. The vehicle external environment recognition device of claim 1, wherein the pedestrian identifying module identifies the object to be a pedestrian when the appearance point is a predetermined value or greater and the pedestrian point equals to or greater than the threshold.

3. The vehicle external environment recognition device of claim 1, wherein the positional point is derived based on one or more parameters selected from the group consisting of a traveling path lateral position, a traveling speed, and an accumulated moving amount of the object.

4. The vehicle external environment recognition device of claim 2, wherein the positional point is derived based on one or more parameters selected from the group consisting of a traveling path lateral position, a traveling speed, and an accumulated moving amount of the object.

5. The vehicle external environment recognition device of claim 1, wherein the appearance point is derived based on one or more parameters selected from the group consisting of a height, an aspect ratio, a spatial relationship, a partiality, an artificiality, a contour agreement, and a caution level of the object.

6. The vehicle external environment recognition device of claim 2, wherein the appearance point is derived based on one or more parameters selected from the group consisting of a height, an aspect ratio, a spatial relationship, a partiality, an artificiality, a contour agreement, and a caution level of the object.

7. The vehicle external environment recognition device of claim 3, wherein the appearance point is derived based on one or more parameters selected from the group consisting of a height, an aspect ratio, a spatial relationship, a partiality, an artificiality, a contour agreement, and a caution level of the object.

8. The vehicle external environment recognition device of claim 4, wherein the appearance point is derived based on one or more parameters selected from the group consisting of a height, an aspect ratio, a spatial relationship, a partiality, an artificiality, a contour agreement, and a caution level of the object.

9. The vehicle external environment recognition device of claim 1, further comprising:
   a contour identifying module that identifies a contour of the object from an edge based on luminance of the image; and
   a color tone determining module that compares color tones of pixels inside and outside the contour of the object o identify the object o be a pedestrian based on a result of the comparison.

10. The vehicle external environment recognition device of claim 2, further comprising:
    a contour identifying module that identifies a contour of the object from an edge based on luminance of the image; and
    a color tone determining module that compares color tones of pixels inside and outside the contour of the object to identify the object to be a pedestrian based on a result of the comparison.

11. The vehicle external environment recognition device of claim 3, further comprising:
    a contour identifying module that identifies a contour of the object from an edge based on luminance of the image; and
    a color tone determining module that compares color tones of pixels inside and outside the contour of the object to identify the object to be a pedestrian based on a result of the comparison.

12. The vehicle external environment recognition device of claim 4, further comprising:
    a contour identifying module that identifies a contour of the object from an edge based on luminance of the image; and
    a color tone determining module that compares color tones of pixels inside and outside the contour of the object to identify the object to be a pedestrian based on a result of the comparison.

13. The vehicle external environment recognition device of claim 5, further comprising:
    a contour identifying module that identifies a contour of the object from an edge based on luminance of the image; and
    a color tone determining module that compares color tones of pixels inside and outside the contour of the object to identify the object to be a pedestrian based on a result of the comparison.

14. The vehicle external environment recognition device of claim 6, further comprising:
    a contour identifying module that identifies a contour of the object from an edge based on luminance of the image; and
    a color tone determining module that compares color tones of pixels inside and outside the contour of the object to identify the object to be a pedestrian based on a result of the comparison.

15. The vehicle external environment recognition device of claim 7, further comprising:
    a contour identifying module that identifies a contour of the object from an edge based on luminance of the image; and
    a color tone determining module that compares color tones of pixels inside and outside the contour of the object to identify the object to be a pedestrian based on a result of the comparison.

16. The vehicle external environment recognition device of claim 8, further comprising:
    a contour identifying module that identifies a contour of the object from an edge based on luminance of the image; and
    a color tone determining module that compares color tones of pixels inside and outside the contour of the object to identify the object to be a pedestrian based on a result of the comparison.

17. A vehicle external environment recognition device, comprising:
    a three-dimensional position deriving module that derives three-dimensional positions of subject parts in a real space based on an image obtained by imaging a detection area;
    an object identifying module that groups the subject parts of which differences in the three-dimensional positions are within a predetermined range to identify an object;
    a contour identifying module that identifies a contour of the object from an edge based on luminance of the image; and
    a color tone determining module that compares color tones of pixels inside and outside the contour of the object to identify the object to be a pedestrian based on a result of the comparison.

* * * * *